J. Lerch,
Harrow.
No. 97,205. Patented Nov. 23, 1869.

2 Sheets, Sheet 1.

WITNESSES
Wm Aflet
Jno B Harding.

J. Lerch
by his Atty.
H Howson

J. Lerch,
Harrow.
No. 97,205. Patented Nov. 23, 1869.
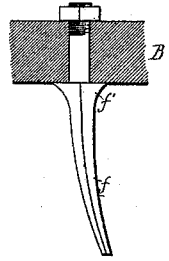
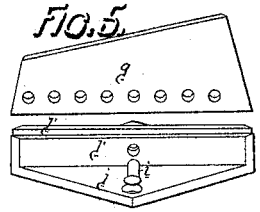
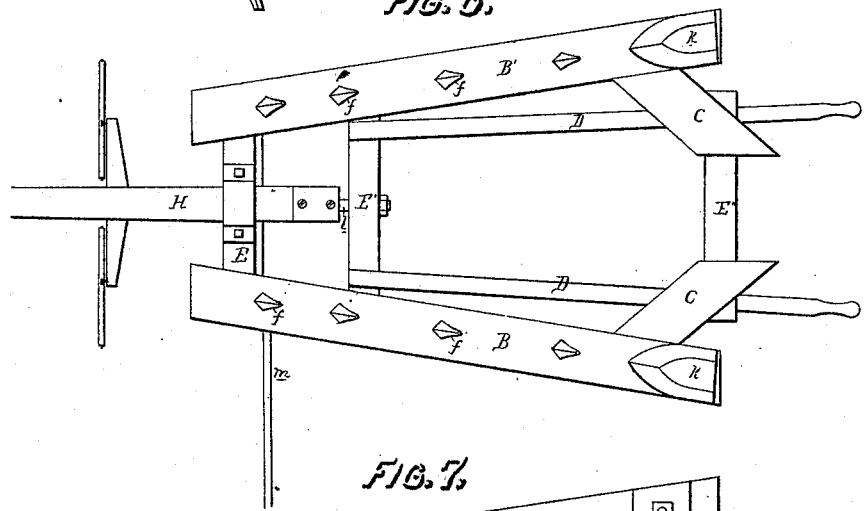
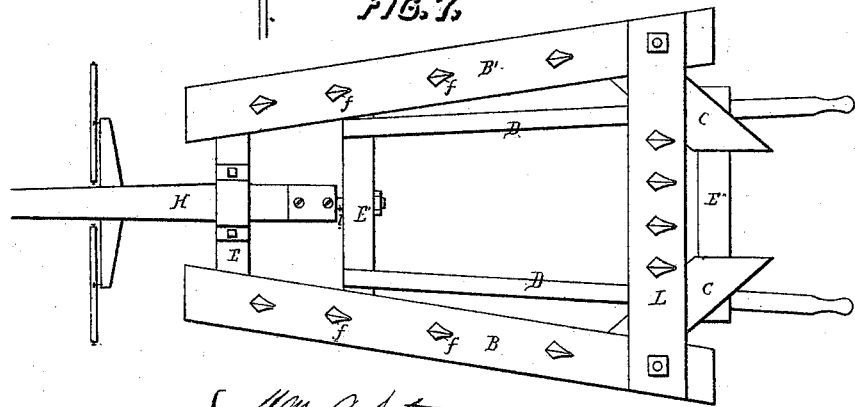
WITNESSES
Wm. A. Steel
Jno. B. Harding
John Lerch
by his atty
H. Howson

United States Patent Office.

JOHN LERCH, OF UHLERSVILLE, PENNSYLVANIA.

Letters Patent No. 97,205, dated November 23, 1869.

IMPROVEMENT IN COMBINED HARROW AND CULTIVATOR.

The Schedule referred to in these Letters Patent and making part of the same.

*To all whom it may concern:*

Be it known that I, JOHN LERCH, of Uhlersville, Northampton county, Pennsylvania, have invented a Combined Harrow and Cultivator; and I do hereby declare the following to be a full, clear, and exact description of the same.

Nature and Objects of the Invention.

My invention consists of a combined harrow and cultivator, constructed in the peculiar manner fully described hereafter, so as to remove stones and clods from each side of a row of young corn, break the clods, loosen the soil, and turn it against or adjacent to the row.

My invention further consists of a device for raising such stalks or blades of corn as may have been beaten down, and also of other improvements, explained hereafter.

Description of the Accompanying Drawings.

Figure 1:
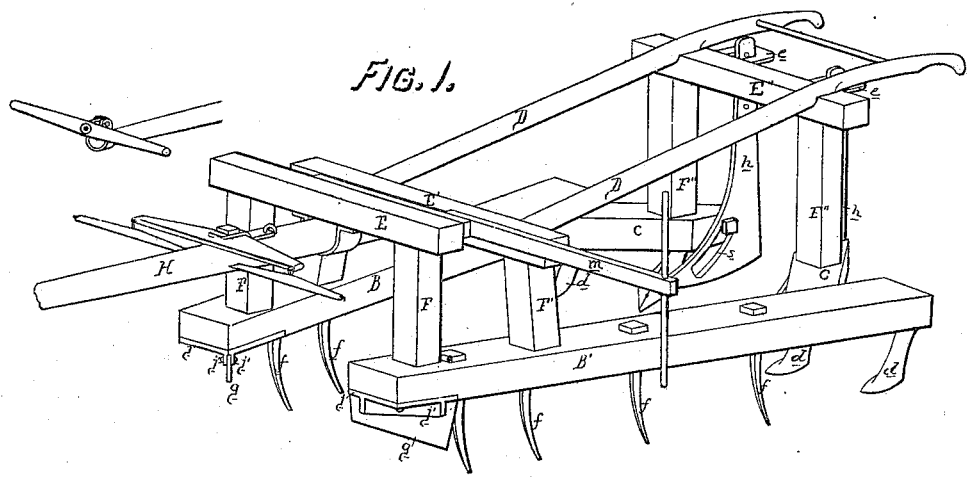
Figure 2:
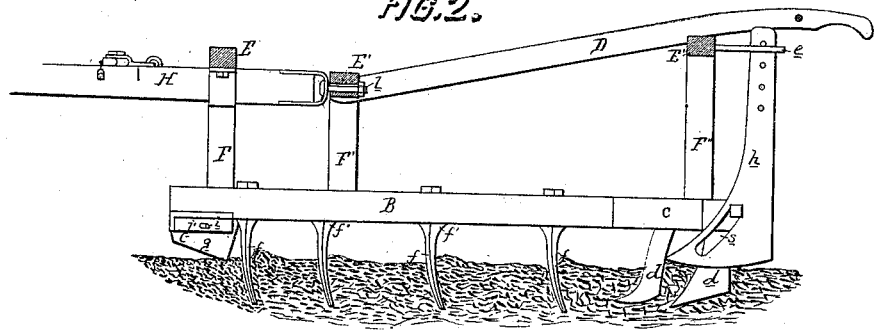
Figure 3:
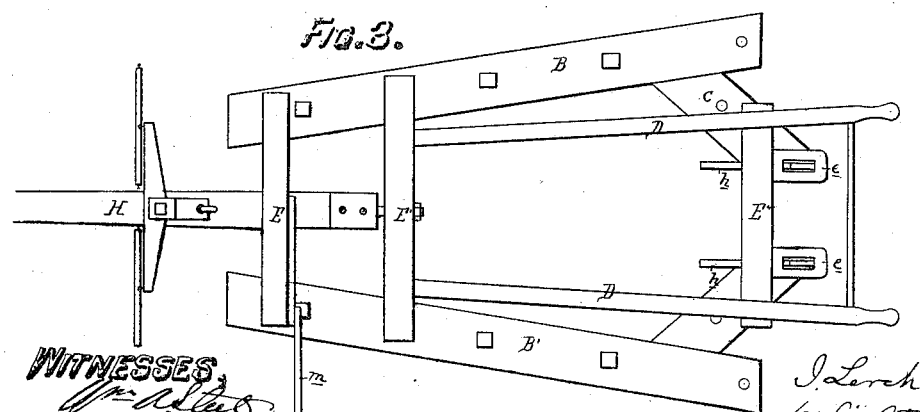

Figure 1, Drawing No. 1, is a perspective view of my combined harrow and cultivator;

Figure 2, a longitudinal section of the same;

Figure 3, a plan view;

Figures 4 and 5, Drawing No. 2, views of parts of the implement detached;

Figure 6, an inverted plan view, showing the implement as arranged for a marker; and Figure 7, an inverted plan view of the implement arranged as a harrow.

General Description.

The frame-work of the implement consists of the two lower bars, B and B', (inclined in contrary directions, as seen in fig. 3,) each of which has a projection, C, the bars being connected, by posts F, F', and F''', to cross-pieces E, E', and E''.

A pole, H, is so attached to the cross-piece E', by means of a pin, l, as to turn freely, and passes through a staple, secured to the cross-piece F.

Two hannes, D D, are secured to the cross-bar E', and extend beyond the cross-piece E'', to which they are also secured.

To the under side of each of the bars B and B', at the front end of the same, is attached an inclined scraper, g, and to the bars is also secured a series of harrow-teeth, f f, and at the rear of the latter, the cultivator-teeth d d.

From the rear of the cross-piece E'', project plates e e, through slots in which pass the upper ends of lifters h h, each of the latter being confined, at the lower end, to the frame, by a pin passing through a curved slot in the lifter, as best observed in fig. 2.

The scraper g, above referred to, is fitted between flanges, j' j', on a plate, j, one of which is secured to the under side of each of the bars B and B', a bolt, i, passing through the flanges, and through one of a number of holes in the scraper, so that the latter can be adjusted on the plate, and secured after adjustment. (See fig. 5.)

A shoulder, f', is formed on each of the harrow-teeth f, for bearing against the under side of the bar B, through which the stem of the tooth projects, so as to receive a nut bearing on the top of the bar. By this arrangement, a tooth can be readily withdrawn and replaced at pleasure.

The implement is arranged to straddle the row of young corn when the stalks of the latter are from six to eighteen inches high, and as it is drawn forward, the inclined scrapers displace all stones, grass, clods of earth, &c., adjacent to the corn, and move them in front of the harrow-teeth, the sharp edges of which cut up the grass and clods, and tend to turn the same under, in consequence of the teeth being curved backward, as shown.

The cultivator-teeth then turn the soil over and against or adjacent to the row of corn, the innermost cultivator-teeth admitting of being so adjusted that the soil may be deposited nearer to or further from the stalks, as circumstances may suggest.

The bent points of the lifters h h are so situated, in respect to the inner cultivator-teeth, that they will elevate such of the young blades of corn as may have been beaten down, and prevent them from being cut by the teeth, the soil deposited near the stalks by the cultivator-teeth tending to retain the previously-depressed stalks in an elevated position.

These lifters, owing to their curved slots s s, will, on meeting any obstructions, ride over the same.

The pole H being attached by a swivel-joint to the implement, the latter can be turned on its side, in passing stumps or other obstructions, or in going over a road, without disturbing the harness.

Fig. 6 illustrates another use to which the implement may be put, that of a marker.

This conversion is accomplished by simply removing the scrapers and the cultivator-teeth, and in place of the latter, applying markers, k k, situated at a proper distance apart, the marking-rod m, shown in fig. 1, being used as a guide in directing the implement.

Fig. 7 illustrates another adaptation of my invention.

By removing the scraper and cultivator-teeth, and by bolting to the rear of the frame A A', a bar, L, provided with any suitable number of harrow-teeth, the implement can be readily converted into an ordinary harrow.

Claims.

1. The arrangement, in front of the harrow-teeth f f, of inclined scrapers g, as set forth.

2. The scrapers, so combined with a flanged plate, j, secured to the former, as to be adjustable thereon.

3. The lifters h, constructed and applied to the frame of the implement, substantially as set forth.

4. The combination of the said lifters with the innermost adjustable cultivator-teeth.

In testimony whereof, I have signed my name to this specification, in the presence of two subscribing witnesses.

JOHN LERCH.

Witnesses:
 E. H. BAILEY,
 HARRY SMITH.